(12) United States Patent
Zhang et al.

(10) Patent No.: US 11,194,887 B2
(45) Date of Patent: Dec. 7, 2021

(54) DATA PROCESSING DEVICE AND METHOD, AND DIGITAL SIGNAL PROCESSING DEVICE

(71) Applicant: HeFei University of Technology, Anhui (CN)

(72) Inventors: Duoli Zhang, Anhui (CN); Ziyan Ye, Anhui (CN); Qi Sun, Anhui (CN); Yukun Song, Anhui (CN); Gaoming Du, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 309 days.

(21) Appl. No.: 16/503,112

(22) Filed: Jul. 3, 2019

(65) Prior Publication Data
US 2020/0012704 A1 Jan. 9, 2020

(30) Foreign Application Priority Data
Jul. 4, 2018 (CN) .......................... 201810725767.9

(51) Int. Cl.
*G06F 17/16* (2006.01)
*G06F 3/06* (2006.01)

(52) U.S. Cl.
CPC ............ *G06F 17/16* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 5,303,058 | A | 4/1994 | Fukuda et al. |
| 7,548,592 | B2 * | 6/2009 | Wight ................. H04B 7/0443 375/260 |
| 8,229,017 | B1 * | 7/2012 | Lee ..................... H04B 7/0665 375/267 |
| 9,374,249 | B2 * | 6/2016 | Hasegawa ......... H04L 25/03878 |
| 2009/0125780 | A1 | 5/2009 | Taylor et al. |
| 2012/0166502 | A1 | 6/2012 | Chen et al. |

FOREIGN PATENT DOCUMENTS

CN 105608059 A 5/2016

OTHER PUBLICATIONS

Hei, "A method of solving inverse of a matrix," Journal of Harbin Institute of Technology, vol. 36, No. 10, Oct. 2004, pp. 1351-1353.
Hei, "Matrix In-situ Replacement Solution Method," Science of Surveying and Mapping, vol. 34, No. 4, Jul. 2009, pp. 30-33.

* cited by examiner

*Primary Examiner* — Idriss N Alrobaye
*Assistant Examiner* — Dayton Lewis-Taylor
(74) *Attorney, Agent, or Firm* — Birch, Stewart, Kolasch & Birch, LLP

(57) ABSTRACT

The application discloses a data processing device, a data processing method and a digital signal processing device. The data processing device is used to reduce computing amount by reading and writing operation of memory. The data processing device comprises: a module for calculating reduced coefficient matrices, a storage module, a module for modifying reduced coefficient matrices, a module for triangular inversing, a module for obtaining inversion matrices and a module for correcting reverse result.

3 Claims, 2 Drawing Sheets

DATA PROCESSING DEVICE AND METHOD, AND DIGITAL SIGNAL PROCESSING DEVICE

RELATED APPLICATION

This application claims the priority of Chinese invention application No. 201810725767.9 filed on Jul. 4, 2018 under the title "Data processing device and method to reduce the amount of computing by reading and writing operation on memory".

TECHNICAL FIELD

The application relates to the technical field of data processing, particularly to an efficient data processing method and device by reading and writing operation of memory.

BACKGROUND

A lot of matrix operations are now required in field of engineering. The matrix inversion is the key step of many complex data processing.

The existing matrix inversion methods include primary transformation method, accompanying matrix method, blocking matrix method and matrix decomposition method. The primary transformation method and the accompanying matrix method demand a lot on computing resources and storage resources, which are not conducive to hardware implementation. A block matrix is used to transfer a high-order matrix into low-order ones, where calculations and resource requirements grow squarely when the order is large. Matrix decomposition mainly includes singular value decomposition, LU decomposition and QR decomposition and so on. Although the singular value decomposition and QR decomposition are widely applicable, the calculation is huge, the decomposition process is complex, not suitable for hardware implementation due to the need for vector unitization. In contrast, the LU decomposition method is simple in the calculation format and more suitable for hardware implementation, so designers often use LU decomposition in inverse operation.

In "One Matrix Inversion Method", 2004, Volume 10, Journal of Harbin Institute of Technology, He Zhijian put forward the insituated method of in-situ replacing matrix based on LU decomposition; however, because of the characteristics of some formulas in the algorithm, it merely may applied in diagonal dominant matrix. He Zhijian's article named "Matrix In-situ Replacement Solution Method" 2009, Volume 4, Science of Surveying and Mapping, made a secondary adjustment of the algorithm for the expansion of applicability, but it introduced a large number of multiplication operations, which are very not conducive to the implementation of the project. Both a large number of computing units and the overall computing cycle were added.

SUMMARY

In order to solve the problems such as the high computational complexity of engineering implementation, an efficient data processing method by reading and writing operation is proposed. A simple and efficient data processing method enables better performance in engineering implementation.

Specifically, in one aspect, the present invention proposes a data processing device, which is used to reduce computing amount by reading and writing operation on memory, wherein, the data processing device comprises: a module for calculating reduced coefficient matrices, a storage module, a module for modifying reduced coefficient matrices, a module for triangular inversing, a module for obtaining inversion matrices and a module for correcting reverse result; wherein, the module of calculating reduced coefficient matrices is used to perform primary row transformation and primary column transformation on upper triangular matrix and lower triangular matrix of the source matrix A respectively, obtaining an upper triangular matrix and a lower triangular matrix, and obtain a reduced coefficient matrix N of the source matrix A by combining the upper triangular matrix and the lower triangular matrix;

the module for modifying reduced coefficient matrices is used to modifying all diagonal elements of the reduced coefficient matrix N as positive numbers by reading and writing operation, to obtain the modified reduced coefficient matrix N';

the module of triangular inversing is used to reverse a upper triangle matrix of the modified reduced coefficient matrix and a lower triangle matrix of the modified reduced coefficient matrix, respectively, and obtain the modified upper and lower triangular inversion matrix $U^{*-1}$ and $L^{*-1}$ respectively;

the module for obtaining inversion matrices is used to multiply the modified upper triangular inversion matrix $U^{*-1}$ with the modified lower triangle inversion matrix $L^{*-1}$, to obtain a modified inversion matrix $A^{*-1}$;

the module for correcting reverse result is used to make a secondary modifying of the modified inversion matrix $A^{*-1}$ by reading and writing operation in a memory;

the storage module is used to store the computing data, wherein, the module for modifying reduced coefficient matrices modifies the reduced coefficient matrix N by: multiplying the reduced coefficient matrix N with a modifying matrix m on the right, wherein, the diagonal elements of modifying matrix m are read first, and then a symbol bits of the diagonal element are checked one by one, if the symbol bit of one diagonal element is positive, no operation is performed on the row of the reduced coefficient matrix N corresponding to the diagonal element; or else, the entire row of data corresponding to the diagonal element is read out, the symbol bits of elements in this row are reversed, and the entire row of data is written back to its original storage location, and the module for correcting reverse result makes a secondary modification on the modified inversion matrix by the following formula, $$A^{-1} = A^{*-1} \times m \tag{11}$$

wherein, the operation of formula (11) is performed as such: read the diagonal elements of the matrix m at first, and then symbol bits of the diagonal elements are checked one by one, if the symbol bit of one diagonal element is positive, no operation is performed on the column of the modified reverse matrix A*−1; or else, the entire column of data corresponding to the diagonal element is read out, the symbol bits of elements in this column are reversed, and the entire column of data is written back to its original storage location.

Preferably, the source matrix A is expressed as $$\begin{bmatrix} M_{11} & M_{12} & L & M_{1i} & L & M_{1n} \\ M_{21} & M_{22} & L & M_{2i} & L & M_{2n} \\ M & M & L & M & L & M \\ M_{J1} & M_{j2} & L & M_{ji} & L & M_{jn} \\ M & M & L & M & L & M \\ M_{n1} & M_{n2} & L & M_{ni} & L & M_{nn} \end{bmatrix},$$

which is a n-order square in which none of the sequential principal minor is equal to 0 in each order, wherein i=1, 2, 3, ..., n, and j=1, 2, 3, ..., n, wherein, the module of calculating a reduced coefficient matrix obtains the reduced coefficient matrix N by:
transforming the source matrix A into the upper triangular matrix $U_1$ by means of primary row transformation, which is as follows:

$$\begin{bmatrix} M_{11.0} & M_{12.0} & L & M_{1i.0} & L & M_{1n.0} \\ M_{21.0} & M_{22.0} & L & M_{2i.0} & L & M_{2n.0} \\ M & M & L & M & L & M \\ M_{j1.0} & M_{j2.0} & L & M_{ji.0} & L & M_{jn.0} \\ M & M & L & M & L & M \\ M_{n1.0} & M_{n2.0} & L & M_{ni.0} & L & M_{nn.0} \end{bmatrix} \rightarrow$$

Performing the steps as above in cycle for multiple times until the upper triangular matrix $U_1$ can be got, wherein, $$U_1 = \begin{bmatrix} U_{11} & U_{12} & \Lambda & U_{1i} & \Lambda & U_{1n} \\ 0 & U_{22} & \Lambda & U_{2i} & \Lambda & U_{2n} \\ M & M & \Lambda & M & \Lambda & M \\ 0 & 0 & \Lambda & U_{ii} & \Lambda & U_{in} \\ M & M & \Lambda & M & \Lambda & M \\ 0 & 0 & \Lambda & 0 & \Lambda & U_{nn} \end{bmatrix}$$

$$= \begin{bmatrix} M_{11.0} & M_{12.0} & \Lambda & M_{1i.0} & \Lambda & M_{1n.0} \\ 0 & M_{22.1} & \Lambda & M_{2i.1} & \Lambda & M_{2n.1} \\ M & M & \Lambda & M & \Lambda & M \\ 0 & 0 & \Lambda & M_{ii.i-1} & \Lambda & M_{in.i-1} \\ M & M & \Lambda & M & \Lambda & M \\ 0 & 0 & \Lambda & 0 & \Lambda & M_{nn.n-1} \end{bmatrix}$$

$$\begin{bmatrix} M_{11.0} & M_{12.0} & L & M_{1i.0} & L & M_{1n.0} \\ 0 & M_{22.0} - \dfrac{M_{21.0} \times M_{12.0}}{M_{11.0}} & L & M_{2i.0} - \dfrac{M_{21.0} \times M_{1i.0}}{M_{11.0}} & L & M_{2n.0} - \dfrac{M_{21.0} \times M_{1n.0}}{M_{11.0}} \\ M & M & L & M & L & M \\ 0 & M_{j2.0} - \dfrac{M_{31.0} \times M_{12.0}}{M_{11.0}} & L & M_{ji.0} - \dfrac{M_{j1.0} \times M_{1i.0}}{M_{11.0}} & L & M_{jn.0} - \dfrac{M_{j1.0} \times M_{1n.0}}{M_{11.0}} \\ M & M & L & M & L & M \\ 0 & M_{n2.0} - \dfrac{M_{n1.0} \times M_{12.0}}{M_{11.0}} & L & M_{ni.0} - \dfrac{M_{n1.0} \times M_{1i.0}}{M_{11.0}} & L & M_{nn.0} - \dfrac{M_{n1.0} \times M_{1n.0}}{M_{11.0}} \end{bmatrix} \rightarrow \rightarrow \dots$$

$$\begin{bmatrix} M_{11.0} & M_{12.0} & L & M_{1i.0} & L & M_{1n.0} \\ 0 & M_{22.1} & L & M_{2i.1} & L & M_{2n.1} \\ M & M & L & M & L & M \\ 0 & 0 & L & M_{ji.1} - \dfrac{M_{j2.1} \times M_{2i.1}}{M_{22.1}} & L & M_{jn.1} - \dfrac{M_{j2.1} \times M_{2n.1}}{M_{22.1}} \\ M & M & L & M & L & M \\ 0 & 0 & L & M_{ni.1} - \dfrac{M_{n2.1} \times M_{2i.1}}{M_{22.1}} & L & M_{nn.1} - \dfrac{M_{n2.1} \times M_{2n.1}}{M_{22.1}} \end{bmatrix} \rightarrow$$

Wherein, as for the element $M_{ji,k}$ (i=1, 2, 3, ..., n; j=1, 2, 3, ..., n; k=0, 1, 2, ..., n−1) in the matrix, the subscript k represents the data obtained in the $k^{th}$ iteration, since each step of the primary line transformation is equivalent to multiplying by a reversible matrix, then the above primary line transformation can be equivalent to multiplying by a series of reversible matrices $P_1, P_2, ..., P_{n-1}$, where, $$P_1 = \begin{bmatrix} 1 & 0 & L & 0 & L & 0 \\ -\frac{M_{21.0}}{M_{11.0}} & 1 & L & 0 & L & 0 \\ M & M & O & M & L & M \\ -\frac{M_{i1.0}}{M_{11.0}} & 0 & L & 1 & L & 0 \\ M & M & L & M & O & M \\ -\frac{M_{n1.0}}{M_{11.0}} & 0 & L & 0 & L & 1 \end{bmatrix},$$

$$P_2 = \begin{bmatrix} 1 & 0 & L & 0 & L & 0 \\ 0 & 1 & L & 0 & L & 0 \\ M & M & O & M & L & M \\ 0 & -\frac{M_{i2.1}}{M_{22.1}} & L & 1 & L & 0 \\ M & M & L & M & O & M \\ 0 & \frac{M_{n2.1}}{M_{22.1}} & L & 0 & L & 1 \end{bmatrix},$$

$$P_i = \begin{bmatrix} 1 & L & 0 & L & 0 \\ M & O & M & L & M \\ 0 & L & 1 & L & 0 \\ 0 & L & -\frac{M_{(i+1)i.(i-1)}}{M_{ii.(i-1)}} & L & 0 \\ M & L & M & O & M \\ 0 & L & -\frac{M_{(n-1)i.(i-1)}}{M_{ii.(i-1)}} & L & 1 \end{bmatrix},$$

$$P_{n-1} = \begin{bmatrix} 1 & L & 0 & L & 0 & 0 \\ M & O & M & L & M & M \\ 0 & L & 1 & L & 0 & 0 \\ M & M & M & O & M & M \\ 0 & L & 0 & L & 1 & 0 \\ 0 & L & 0 & L & -\frac{M_{n(n-1).(n-2)}}{M_{(n-1)(n-1)}} & 1 \end{bmatrix}$$

wherein, i=1, 2, ..., n−1;

assuming that the reversible matrices of the series can be expressed uniformly as $P = P_{n-1} \times ... \times P_i \times ... \times P_1$, (wherein, P is also a n-order square matrix), then $$U_1 = P \times A \tag{1}$$

$$\begin{cases} U_{1i} = M_{1i.0} \\ U_{ji} = M_{ji.0} - \sum_{s=1}^{j-1} \frac{M_{js.s-1} \times M_{si.s-1}}{M_{ss.s-1}} \end{cases} \tag{2}$$

making a column transformation of the source matrix A, to get a lower triangular matrix $L_1$, wherein, the lower triangular matrix $L_1$ can be obtained by doing primary column transformation on the source matrix A, and the transformation is as follows:

$$\begin{bmatrix} M_{11.0} & M_{12.0} & L & M_{1i.0} & L & M_{1n.0} \\ M_{21.0} & M_{22.0} & L & M_{2i.0} & L & M_{2n.0} \\ M & M & L & M & L & M \\ M_{j1.0} & M_{j2.0} & L & M_{ji.0} & L & M_{jn.0} \\ M & M & L & M & L & M \\ M_{n1.0} & M_{n2.0} & L & M_{ni.0} & L & M_{nn.0} \end{bmatrix} \rightarrow$$

$$\begin{bmatrix} M_{11.0} & 0 & L & 0 & L & 0 \\ M_{21.0} & M_{22.0} - \frac{M_{21.0} \times M_{12.0}}{M_{11.0}} & L & M_{2i.0} - \frac{M_{21.0} \times M_{1i.0}}{M_{11.0}} & L & M_{2n.0} - \frac{M_{21.0} \times M_{1n.0}}{M_{11.0}} \\ M & M & L & M & L & M \\ M_{j1.0} & M_{j2.0} - \frac{M_{31.0} \times M_{12.0}}{M_{11.0}} & L & M_{ji.0} - \frac{M_{j1.0} \times M_{1i.0}}{M_{11.0}} & L & M_{jn.0} - \frac{M_{j1.0} \times M_{1n.0}}{M_{11.0}} \\ M & M & L & M & L & M \\ M_{n1.0} & M_{n2.0} - \frac{M_{n1.0} \times M_{12.0}}{M_{11.0}} & L & M_{ni.0} - \frac{M_{n1.0} \times M_{1i.0}}{M_{11.0}} & L & M_{nn.0} - \frac{M_{n1.0} \times M_{1n.0}}{M_{11.0}} \end{bmatrix} \rightarrow \rightarrow ...$$

-continued $$\begin{bmatrix} M_{11.0} & 0 & L & 0 & L & 0 \\ M_{21.0} & M_{22.1} & L & 0 & L & 0 \\ M & M & L & M & L & M \\ M_{j1.0} & M_{j2.1} & L & M_{ji.1} - \dfrac{M_{j2.1} \times M_{2i.1}}{M_{22.1}} & L & M_{jn.1} - \dfrac{M_{j2.1} \times M_{2n.1}}{M_{22.1}} \\ M & M & L & M & L & M \\ M_{n1.0} & M_{n2.1} & L & M_{ni.1} - \dfrac{M_{n2.1} \times M_{2i.1}}{M_{22.1}} & L & M_{nn.1} - \dfrac{M_{n2.1} \times M_{2n.1}}{M_{22.1}} \end{bmatrix} \rightarrow$$

the column transformation can also be done by multiplying matrices $Q_1, Q_2, \ldots, Q_{n-1}$, namely multiplying matrices $Q$, $Q = Q_1 \times Q_2 \times \ldots \times Q_{n-1}$, and $Q_1 = P_1^T$, $Q_2 = P_2^T, \ldots, Q_{n-1} = P_{n-1}^T$, and then $$L_1 = A \times Q \qquad (3)$$

$$\begin{cases} L_{j1} = M_{j1.0} \\ L_{ji} = M_{ji.0} - \sum_{s=1}^{i-1} \dfrac{M_{js.s-1} \times M_{si.s-1}}{M_{ss.s-1}} \end{cases} \qquad (4)$$

Then, a reduced coefficient matrix N can be got by combining the Formulas (2) with Formulas (4). wherein, the upper triangle elements of N are equal to the corresponding values of the upper triangular matrix $U_1$, and the lower triangle elements are equal to the corresponding values of the lower triangular matrix $L_1$, respectively, $$\begin{cases} N_{j1} = M_{j1.0} \\ N_{1i} = M_{1i.0} \\ N_{ii} = M_{ii.0} - \sum_{s=1}^{i-1} \dfrac{M_{is.s-1} \times M_{si.s-1}}{M_{ss.s-1}}, & j = i \\ N_{ji} = M_{ji.0} - \sum_{s=1}^{j-1} \dfrac{M_{js.s-1} \times M_{si.s-1}}{M_{ss.s-1}}, & j < i \\ N_{ji} = M_{ji.0} - \sum_{s=1}^{i-1} \dfrac{M_{js.s-1} \times M_{si.s-1}}{M_{ss.s-1}}, & j > i \end{cases} \qquad (5)$$

Preferably, the module of triangular inversing is used to obtain the modified triangular inversion matrix $U^{*-1}$ and $L^{*-1}$ based on the modified reduced coefficient matrix:

$$U^{*-1} = \begin{bmatrix} u_{11} & u_{12} & L & u_{1i} & L & u_{1n} \\ & u_{22} & L & u_{2i} & L & u_{2n} \\ & & O & M & L & M \\ & & & u_{ii} & L & u_{in} \\ & & & & O & M \\ & & & & & u_{nn} \end{bmatrix} \text{ and}$$

$$L^{*-1} = \begin{bmatrix} 1_{11} & & & & & \\ 1_{21} & 1_{22} & & & & \\ M & M & O & & & \\ 1_{j1} & 1_{j2} & L & 1_{jj} & & \\ M & M & M & M & O & \\ 1_{n1} & 1_{n2} & L & 1_{ni} & L & 1_{nn} \end{bmatrix} ; \text{ wherein,}$$

-continued $$\begin{cases} U_{ji}^* = \dfrac{N_{ji}'}{\sqrt{N_{jj}'}}, & j < i \\ L_{ji}^* = \dfrac{N_{ji}'}{\sqrt{N_{ii}'}}, & j > i \\ U_{ii}^* = L_{ii}^* = \dfrac{N_{ii}'}{\sqrt{N_{ii}'}}, & i = j \\ U_{ji}^* = 0, & j > i \\ L_{ji}^* = 0, & j < i \end{cases} \qquad (8)$$

$$\begin{cases} 1_{ii} = u_{ii} = \dfrac{1}{\sqrt{N_{ii}'}}, & i = 1, 2, 3, L, n \\ 1_{ji} = -1_{jj} \times \sum_{s=i}^{j-1} (N_{js}' \times 1_{ss} \times 1_{si}), & \begin{matrix} i = 1, 2, 3, L, n; \\ j = i+1, i+2, L, n \end{matrix} \\ u_{ji} = -u_{ii} \times \sum_{s=j}^{i-1} (N_{si}' \times u_{ss} \times u_{js}), & \begin{matrix} j = 1, 2, 3, L, n; \\ i = j+1, j+2, L, n \end{matrix} \end{cases} \qquad (9)$$

Preferably, the module for obtaining inversion matrix calculates modified inversion matrix based on the following formula:

$$A^{*-1} = U^{*-1} \times L^{*-1} \qquad (10)$$

In another aspect, the present invention provides a data processing method, which is used to reduce the computing amount by reading and writing operations on memory, wherein, the data processing method includes:

Step S1, performing the primary row transformation and the primary column transformation on a source matrix A respectively, to obtain a reduced coefficient matrix N of the source matrix A by combining the upper triangular matrix and the lower triangular matrix;

Step S2, modifying each value of diagonal elements of the reduced coefficient matrix N to positive ones by reading and writing operation, to get the modified reduced coefficient matrix N';

Step S3, reversing the upper triangle matrix of the modified reduced coefficient matrix and the lower triangle matrix of the modified reduced coefficient matrix, respectively, and obtaining the modified triangular inversion matrix $U^{*-1}$ and $L^{*-1}$ respectively.

Step S4, multiply the modified upper triangle inversion matrix $U^{*-1}$ and the modified lower triangle inversion matrix $L^{*-1}$, so as to get the modified inversion matrix $A^{-1}$;

Step S5, make a secondary modifying of the modified inversion matrix $A^{*-1}$ by reading and writing operation in a memory;

wherein, modifying the reduced coefficient matrix N in step S2 by: multiplying the reduced coefficient matrix N with a correction matrix m on the right, wherein, the diagonal elements of modifying matrix m are read first, and then a symbol bits of the diagonal element are checked one by one, if the symbol bit of one diagonal element is positive, no operation is performed on the row of the reduced coefficient matrix N corresponding to the diagonal element; or else, the entire row of data corresponding to the diagonal element is read out, the symbol bits of elements in this row are reversed, and the entire row of data is written back to its original storage location, and making a secondary modifying of the modified inversion matrix $A^{*-1}$ in step S5 by the following formula, $$A^{-1} = A^{*-1} \times m \quad (11)$$

wherein, the operation of formula (11) is performed as such: read the diagonal elements of the matrix m at first, and then symbol bits of the diagonal elements are checked one by one, if the symbol bit of one diagonal element is positive, no operation is performed on the column of the modified reverse matrix $A^{*}-1$; or else, the entire column of data corresponding to the diagonal element is read out, the symbol bits of elements in this column are reversed, and the entire column of data is written back to its original storage location.

In another aspect, the present invention provides a digital signal processing device, wherein, the digital signal processing device comprises a signal receiving device, a data computing device and a signal output device, and the data computing device comprises a data processing device described above, and when the data computing device needs to reverse the matrix in the signal processing process, the data computing device calls the data processing device, and uses the method above to reverse the source matrix A.

Preferably, the digital signal processing device is used to deal with matrices in communication signal data or image signal data.

Preferably, the data computing device is a circuit module based on FPGA.

In Formula (4), j=1, 2, 3, . . . , n, and i=1, 2, 3, . . . , j.

The reduced coefficient matrix N can be got by combining with the Formulas (2) and (4). Upper triangle elements of reduced coefficient matrix N are equal to the corresponding values of the upper triangular matrix $U_1$, and the lower triangle elements of reduced coefficient matrix N are equal to the corresponding values of the lower triangular matrix $L_1$. Then, the elements of the Matrix N can be obtained by utilizing Formula (5), where i=1, 2, 3, . . . , n, and j=1, 2, 3, . . . , n.

$$\begin{cases} N_{j1} = M_{j1,0} \\ N_{1i} = M_{1i,0} \\ N_{ii} = M_{ii,0} - \sum_{s=1}^{i-1} \frac{M_{is,s-1} \times M_{si,s-1}}{M_{ss,s-1}}, & j = i \\ N_{ji} = M_{ji,0} - \sum_{s=1}^{j-1} \frac{M_{js,s-1} \times M_{si,s-1}}{M_{ss,s-1}}, & j < i \\ N_{ji} = M_{ji,0} - \sum_{s=1}^{i-1} \frac{M_{js,s-1} \times M_{si,s-1}}{M_{ss,s-1}}, & j > i \end{cases} \quad (5)$$

Since $N_{ji}$ may be positive or negative number, in order to proceed with the next evolution treatment, the reduced coefficient matrix N is first modified, to get the modified matrix N'. The modifying process is to multiply N with a correction matrix m, and the correction matrix N' can be obtained by Formula (7).

$$\begin{bmatrix} m_{11} & & & & & \\ & m_{22} & & & & \\ & & o & & & \\ & & & m_{jj} & & \\ & & & & o & \\ & & & & & m_{nn} \end{bmatrix},$$

wherein, m is an n-order diagonal array. $m_{ii}$ can be obtained by Formula (6), wherein, j=1, 2, 3, . . . , n.

$$\begin{cases} m_{jj} = -1, & N_{jj} < 0 \\ m_{jj} = 1, & N_{jj} > 0 \end{cases} \quad (6)$$

$$N' = m \times N \quad (7)$$

Preferably, step 3 includes obtaining modified triangular matrix. The modified triangular matrices U* and L* can be obtained by the Formula (8). Assuming that the modified triangular inversion matrix is $$U^{*-1} = \begin{bmatrix} u_{11} & u_{12} & L & u_{1i} & L & u_{1n} \\ & u_{22} & L & u_{2i} & L & u_{2n} \\ & & O & M & L & M \\ & & & u_{ii} & L & u_{in} \\ & & & & O & M \\ & & & & & u_{nn} \end{bmatrix} \text{ and}$$

$$L^{*-1} = \begin{bmatrix} 1_{11} & & & & & \\ 1_{21} & 1_{22} & & & & \\ M & M & O & & & \\ 1_{j1} & 1_{j2} & L & 1_{jj} & & \\ M & M & M & M & O & \\ 1_{n1} & 1_{n2} & L & 1_{ni} & L & 1_{nn} \end{bmatrix}.$$

The $u_{ji}$ and $l_{ji}$ can be obtained by Formula (9) in combined with Formula (8), wherein, i=1, 2, 3, . . . , n and j=1, 2, 3, . . . , n.

$$\begin{cases} U_{ji}^* = \frac{N'_{ji}}{\sqrt{N'_{jj}}}, & j < i \\ L_{ji}^* = \frac{N'_{ji}}{\sqrt{N'_{ii}}}, & j > i \\ U_{ii}^* = L_{ii}^* = \frac{N'_{ii}}{\sqrt{N'_{ii}}}, & i = j \\ U_{ji}^* = 0, & j > i \\ L_{ji}^* = 0, & j < i \end{cases} \quad (8)$$

-continued $$\begin{cases} l_{ii} = u_{ii} = \frac{1}{\sqrt{N_{ii}^*}}, & i = 1, 2, 3, L, n \\ l_{ji} = -l_{ii} \times \sum_{s=i}^{j-1} (N_{js}^* \times l_{ss} \times l_{si}), & i = 1, 2, 3, L, n; j = i+1, i+2, L, n \\ u_{ji} = -u_{ii} \times \sum_{s=j}^{i-1} (N_{si}^* \times u_{ss} \times u_{js}), & j = 1, 2, 3, L, n; i = j+1, j+2, L, n \end{cases} \quad (9)$$

Preferably, the step 4 includes obtaining the modified inversion matrix $A^{*-1}$ by Formula (10), $$A^{*-1} = U^{*-1} \times L^{*-1} \quad (10)$$

Preferably, the step 5 includes obtaining real inversion matrix $A^{-1}$ by Formula (11).

The reason for calling $A^{*-1}$ as the modified inversion matrix is that the matrix also needs to be modified to get the true inversion matrix $A^{-1}$. The process of obtaining the true inversion matrix is using inversion matrix of matrix m to multiply the matrix $A^{*-1}$ on the right. Since the matrix m is a diagonal matrix, and the value of its diagonal is 1 or −1. Then it is not difficult to conclude that the inversion matrix of is equal to itself. So a true inversion matrix can be obtained by using Formula (11).

$$A^{-1} = A^{*-1} \times m \quad (11)$$

Where i=1, 2, 3, . . . , n and j=1, 2, 3, . . . , n.

The above is the derivation process of the algorithm for calculating inverse matrix by in-situ replacement matrix. It can be seen that two matrix multiplications are introduced to expand the application range of the algorithm. Multiply the modifying matrix m on the right and on the left once respectively. For an n-order inversion matrix, a two-time matrix multiplication will add a total of $2n^2$ times of multiplication and 2n (n−1) multiplication, as well as also add the adder and multiplier. The addition of additional multiplication and add operations is not wanted in engineering practice, so the present invention also proposed efficient data processing methods through reading and writing operations on memory in the hardware implementation.

Known from Formula (6), the matrix m is an n-order diagonal array with diagonal elements of 1 or −1. The two times of multiplications in the improved algorithm are done by multiplying the matrix m on the right and left respectively; wherein, the values in m matrix are equal to 0, except for the diagonal elements. If a matrix X is multiplied by m on the right, namely m*X, it is equivalent to working on every row vector of matrix X. If a matrix X is multiplied by m on the left, namely m*X, it is equivalent to working on every column vector of matrix X, and these operations are multiplied by 1 or −1.

The efficient data processing method proposed in the present invention is implemented as follows: when the row (column) vector of a matrix X is multiplied by 1, it is equal to the original value, and then no operations are made on the data and retain the original values. If the row (column) vector of a matrix X is multiplied by −1, the row (column) vector that will be multiplied reads out the entire row (column) and then reverses the symbol bits. The original row (column) vector is updated to a modified value. The matrix multiplication of X and m is accomplished by multiple data reading and writing operations, which not only does not increase the computing resources such as multipliers and adders, but also greatly reduces the complexity and period of calculation. The worst use of this data processing method will increase $2n^2$ times of data reading and writing, and the optimal will not increase data reading and writing, and the data correction can be completed efficiently.

As, compared with existing technologies, the beneficial effects of the present invention are as below:

1. The present invention has proposed a method of data correction on the basis of the existing technologies; the first modifying is to correct the roughing coefficient matrix N. The main purpose is to solve a problem that, in prior art, the diagonal elements of matrix N cannot be less than 0, so it has a limitation that it can only deal with a diagonal possession matrix. All of the values of the diagonal elements of N are turned to positive, so that any LU decomposable matrix can be processed. The second modifying is a secondary process of the revised inversion matrix, which results in a real inverse result. The introduction of correction matrix m expands the applicability of the original algorithm.

2. The modifying matrix m introduced by the present invention is a diagonal array, with diagonal elements of 1 or −1. The invention converting a large number of cumulative matrix multiplication operations into simple and efficient data reading and writing operations on memory. When a matrix is multiplied by m array on the right, some row vectors of the matrix are read and written, and the left multiplication of m array is equivalent to data reading and writing for some of the column vectors of the matrix, which does not require any multiplication or addition etc. The process of data reading and writing for inversing is simple and easy to realize, and it does not add additional DSP processor and computing cycles when the hardware is implemented, which has good application value. In addition, there is no need to increase the amount of computation, maintaining the same complexity as the original diagonal optimization matrix inversion algorithm.

3. The present invention doesn't add additional computational complexity, retains the advantages of the in-situ replacement algorithm, and expands the applicability of the algorithm. The data storage of the whole inversing process only needs the space of the original matrix size, and does not need additional storage, and the parallel operations of the upper and lower triangles guarantee the parallelism of the operation.

DETAILED DESCRIPTION OF EMBODIMENTS

Figure 1:
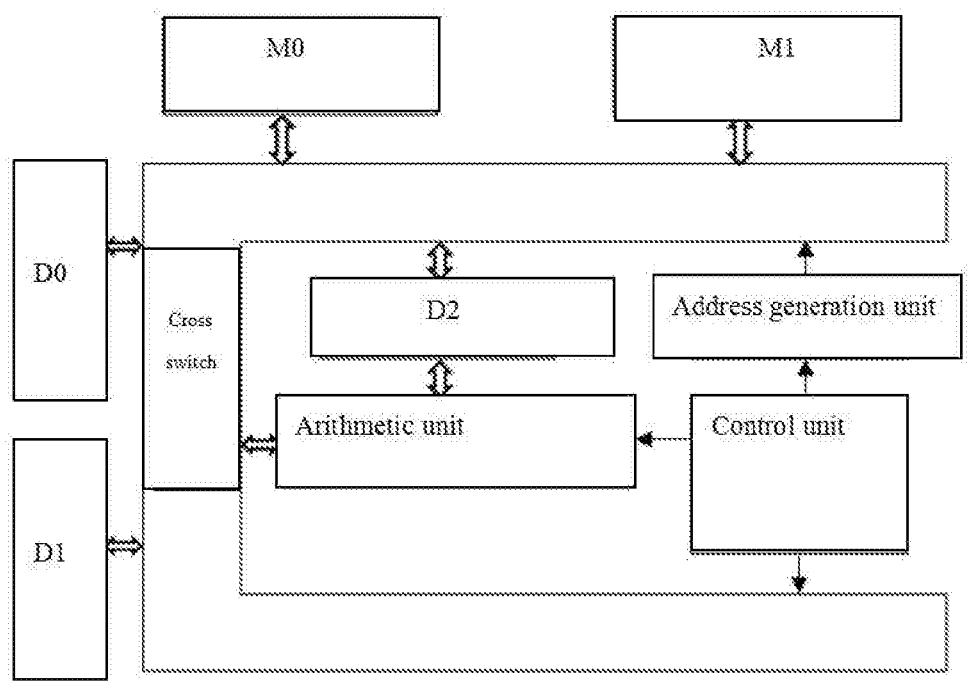
FIG. 1 is a diagram of the hardware architecture of the matrix inverter

The present invention is described in detail in combination with drawings and embodiments below, however, the protection scope of the present invention is not limited to the embodiment.

Embodiment 3 describes the design of the inverter's hardware architecture, and complete the design of the inverter based on the data processing method of the present invention on a development board, to verify the correctness and engineering application value of the data processing method proposed in the present invention.

Embodiment 1

Embodiment 1 describes the process of inverting the matrix of the improved in-situ replacement algorithm in the present invention, taking a 4*4 matrix for example in which none of the sequential principal minor in each orders is equal to 0.

Assuming that the matrix $$A = \begin{bmatrix} 5 & 7 & 9 & 10 \\ 6 & 8 & 10 & 9 \\ 7 & 10 & 8 & 7 \\ 5 & 7 & 6 & 5 \end{bmatrix}$$

is to be decomposed, wherein, A is a 4-order reversible matrix, in which none of the main sequential principal minors of each order is equal to 0.

Step 1, obtaining the reduced coefficient matrix N of the matrix A to be inverted.

Its reduced coefficient matrix $$N = \begin{bmatrix} 5 & 7 & 9 & 10 \\ 6 & -0.4 & -0.8 & -3 \\ 7 & 0.2 & -5 & -8.5 \\ 5 & 0 & -3 & 0.1 \end{bmatrix}$$

can be obtained according to Formula (5):

$$\begin{cases} N_{j1} = M_{j1,0} \\ N_{1i} = M_{1i,0} \\ N_{ii} = M_{ii,0} - \sum_{s=1}^{i-1} \dfrac{M_{is,s-1} \times M_{si,s-1}}{M_{ss,s-1}}, \ j = i \\ N_{ji} = M_{ji,0} - \sum_{s=1}^{j-1} \dfrac{M_{js,s-1} \times M_{si,s-1}}{M_{ss,s-1}}, \ j < i \\ N_{ji} = M_{ji,0} - \sum_{s=1}^{i-1} \dfrac{M_{js,s-1} \times M_{si,s-1}}{M_{ss,s-1}}, \ j > i \end{cases} \quad (5)$$

Step 2, obtaining the modified reduced coefficient matrix N'.

The modified reduced coefficient matrix $$N' = \begin{bmatrix} 5 & 7 & 9 & 10 \\ -6 & 0.4 & 0.8 & 3 \\ -7 & -0.2 & 5 & 8.5 \\ 5 & 0 & -3 & 0.1 \end{bmatrix}$$

can be obtained by Formula (7):

$$N' m \times N \quad (7)$$

Step 3, obtaining the modified triangle inversion matrices $U^{*-1}$ and $L^{*-1}$.

According to Formula (9), the modified triangular inversion matrices $U^{*-1}$ and $L^{*-1}$ can be obtained.

$$\begin{cases} l_{ii} = u_{ii} = \dfrac{1}{\sqrt{N'_{ii}}}, & i = 1, 2, 3, L, n \\ l_{ji} = -l_{jj} \times \sum_{s=i}^{j-1} (N'_{js} \times l_{ss} \times l_{si}), & i = 1, 2, 3, L, n; j = i+1, i+2, L, n \end{cases} \quad (9)$$

$$\left| u_{ji} = -u_{ii} \times \sum_{s=j}^{i-1} (N'_{si} \times u_{ss} \times u_{js}), \ j = 1, 2, 3, L, n; i = j+1, j+2, L, n \right.$$

In this embodiment, the modified upper triangle inversion matrix is $$U^{*-1} = \begin{bmatrix} 0.4472 & -2.2136 & 0.4472 & 21.5035 \\ 0 & 1.5811 & -0.8944 & -12.9653 \\ 0 & 0 & 0.4472 & -5.3759 \\ 0 & 0 & 0 & 3.1623 \end{bmatrix},$$

and the modified lower triangle inversion matrix is $$L^{*-1} = \begin{bmatrix} 0.4472 & 0 & 0 & 0 \\ 1.8974 & 1.5811 & 0 & 0 \\ 0.8944 & 0.2236 & 0.4472 & 0 \\ 0.6325 & 0.9487 & 1.8974 & 3.1623 \end{bmatrix};$$

Step 4: obtaining the modified inversion matrix $A^{*-1}$.

According to Formula (10), the modified upper and lower triangular matrix is calculated as matrix multiplication, and the modified inversion matrix $A^{*-1}$ can be obtained.

$$A^{*-1} = U^{*-1} \times L^{*-1} \quad (10)$$

The result is that $$A^{*-1} = \begin{bmatrix} 10 & 17 & 41 & 68 \\ -6 & -10 & -25 & -41 \\ -3 & -5 & -10 & -17 \\ 2 & 3 & 6 & 10 \end{bmatrix};$$

Step 5, obtaining the inversion matrix $A^{-1}$.

The secondary-modified inversion matrix $$A^{-1} = \begin{bmatrix} 10 & -17 & -41 & 68 \\ -6 & 10 & 25 & -41 \\ -3 & 5 & 10 & -17 \\ 2 & -3 & -6 & 10 \end{bmatrix}$$

is obtained, based on Formula (11), $$A^{-1} = A^{*-1} \times m \quad (11)$$

Because the inversion matrix of a reversible matrix is unique, and a unit matrix is got by multiplying the two matrices; the validity of the results can be verified by multiplying the inversion matrix with the original matrix.

Multiplying Matrix $$A = \begin{bmatrix} 5 & 7 & 9 & 10 \\ 6 & 8 & 10 & 9 \\ 7 & 10 & 8 & 7 \\ 5 & 7 & 6 & 5 \end{bmatrix}$$

with the inversion matrix $$A^{-1} = \begin{bmatrix} 10 & -17 & -41 & 68 \\ -6 & 10 & 25 & -41 \\ -3 & 5 & 10 & -17 \\ 2 & -3 & -6 & 10 \end{bmatrix},$$

we got $$A \times A^{-1} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

The two matrix multiplication can obtain the unit matrix, so it can be proved that A and $A^{-1}$ are inversion matrix of each other, and the method of the present invention is effective.

Embodiment 2

Embodiment 2 describes the process of testing and error analyzing for multiple sets of matrices with different orders and different ranges of values by Matlab software modeling, and verify the applicability of the method and computational complexity of the present invention.

The invention proposed an efficient data processing method by reading and writing operation on memory. The method is used to deal with any n-order matrix in which none of the main sequential principal minors of each order is equal to 0. In order to verify the correctness of this method, the modeling test was carried on Matlab.

Firstly, a set of random matrices was generated by the random number generator, and then the sequential principal minors of each order were checked to satisfy above request. The inversion matrix was got by the data processing method of the present invention, the result was contrasted with the results calculated by Matlab directly, and the error analysis was carried out. In this embodiment, the random matrix samples with orders n of 16, 64, 256 and 1024 were tested and verified, and the matrix samples with different ranges of values were tested in the same order matrix. The matrix data values range from (−10, 10), (−100, 100) and (−1000, 1000) respectively. The results are shown in Table 1:

TABLE 1

Inverse results and errors of different matrix in Matlab

| Matrix order n | Range of data values | Maximum absolute error |
|---|---|---|
| 16 | (−10, 10) | 3.0184e−14 |
| | | 8.2712e−15 |
| | | 1.5266e−15 |
| | (−100, 100) | 5.5581e−15 |
| | | 7.9936e−14 |
| | | 4.5276e−16 |
| | (−1000, 1000) | 3.6429e−17 |
| | | 5.0654e−16 |
| | | 7.8934e−15 |
| 64 | (−10, 10) | 2.4357e−13 |
| | | 1.1879e−14 |
| | | 8.3467e−12 |
| | (−100, 100) | 2.3558e−15 |
| | | 8.6008e−15 |
| | | 8.1879e−16 |

TABLE 1-continued

Inverse results and errors of different matrix in Matlab

| Matrix order n | Range of data values | Maximum absolute error |
|---|---|---|
| | (−1000, 1000) | 1.1639e−15 |
| | | 6.6288e−16 |
| | | 1.1807e−16 |
| 256 | (−10, 10) | 5.0682e−11 |
| | | 3.8620e−13 |
| | | 8.6077e−12 |
| | (−100, 100) | 2.6934e−12 |
| | | 1.2849e−13 |
| | | 2.0300e−13 |
| | (−1000, 1000) | 9.4732e−14 |
| | | 1.0261e−13 |
| | | 3.0453e−14 |
| 1024 | (−10, 10) | 8.1140e−12 |
| | | 7.7079e−12 |
| | | 8.2640e−12 |
| | (−100, 100) | 1.5834e−13 |
| | | 2.1759e−11 |
| | | 1.1436e−12 |
| | (−1000, 1000) | 6.6476e−14 |
| | | 1.9655e−11 |
| | | 2.6380e−14 |

As shown in Table 1, the maximum absolute error of the reverse matrix calculated by the method of present invention and results obtained by Matlab directly is less than $1.0e^{-11}$, indicating that the method can correctly obtain the reverse result. Therefore, it is proved that the method can be applied to the matrix in which none of the main sequential principal minors of each order is equal to 0. As compared with prior art, it can only be applied to the diagonal optimization matrix.

In addition, the complexity of the operation is not increased by the method of the present invention. At present, the matrix inversion method in prior art will increase by at least $2n^2$ addition operations and $3n^2$ multiplication operations, which is not easy to carry out in engineering. The method in the present invention will only increase the data reading and writing within $2n^2$, and the engineering is simple to achieve and reduces the complexity and calculation cycle of inversion.

Embodiment 3

This embodiment provides a data processing device based on data processing method as above, which device comprises: a module for calculating reduced coefficient matrices, storage modules, a module for modifying reduced coefficient matrices, a module for triangular inversing, a module for obtaining inversion matrices and a module for correcting reverse result. The storage modules store the source data and result data calculated at each step, and the block size of the result data is the same size as the source data, reflecting the algorithmic characteristics of in situ replacement.

FIG. 1 shows the architecture of a specific implementation of the inverter in FPGA. When the above modules are implemented in FPGA, the module for calculating reduced coefficient matrices, the module for modifying reduced coefficient matrices, the module for triangular inversing, the module for obtaining inversion matrices and the module for correcting reverse result can all be realized in the operation unit of FPGA.

Figure 2:
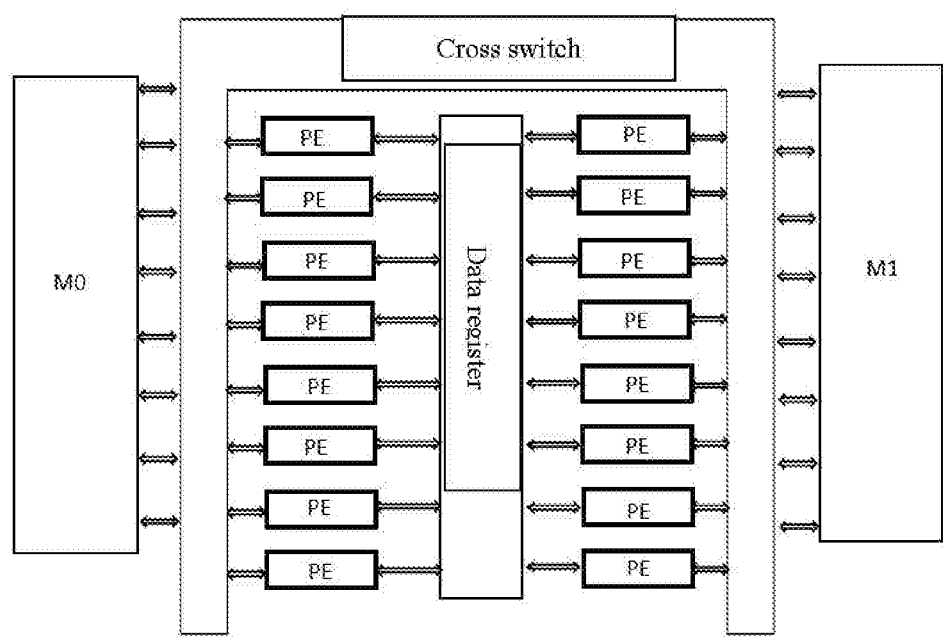
FIG. 2 is a parallel interconnect structure diagram of 16-way PE

The storage modules consist of M0, M1, D0, D1 and D2, wherein, which M0 and M1 are block RAM to store matrix data for each step (except diagonal elements), and D0, D1 and D2 are distributed RAM. D0 is used to store diagonal element for each step, and D1 is used to store the data for the modifying matrix. D2 is used to store some data in the middle that needs to be cached. Storage modules have 8-path memory to store in parallel, each memory corresponds to two-way data, i.e., the upper and lower triangular data, corresponding to 16-path PE parallel calculation. Taking the module for calculating reduced coefficient matrices as an example, FIG. 2 is the interconnect structure of 16-way PE parallel calculations. It can be seen that this structure improves computational parallelism and shortens the calculation cycle.

In this embodiment, it requires that adjacent data in the same row or the same column in the matrix should not be stored in the same memory. At the same time, the upper and lower triangular matrices are folded diagonally, and the elements that are coincident are stitched together, which are stored in the same address at high bits and low bits, respectively. In the example of the 16-order matrix, the source data in Table 2 is stored in the manner of non-conflicting addresses and upper and lower triangle stitching.

This design is to facilitate the parallel operation of the upper and lower triangle matrix and 8-way storage parallel operation, as well as improve the parallelism of engineering.

loop. For the first n/2 lines, the first address for each loop is addr_u_start=addr_u_start+n+1. The first address at the beginning of each line within a loop is addr_u_row=addr_u_row+1 k+n/8. Within a row, it includes two kinds of address jumps, (1) address jump in a loop and (2) address jump between loops. As for address jump between loops, the address is addr_u=addr_u−7k+1, the storage address in a loop is addr_u=addr_u+1k. For the last n/2 lines, the first loop has 7 lines and the rest loops each has 8 lines. The first address of the first loop is addr_u_start=addr_u_start+6k+n−n/8; the first address of the second loop is addr_u_start=addru_start+1k−1; and the rest loops' first address is addr_u_start=addr_u_start−1. Within a loop, the first address at which each line starts to store is addr_u_row=addr_u_row−1k. Within a row, the address jump between two loops is addr_u=addr_u+7k−n/8−1; a loop within the storage address is addr_u=addr_u−1k−n/8.

For the lower triangular matrix, set that 8 rows of data as one loop. For the former n/2 column, the first address for each loop is addr_l_start=addr_l_start+1. Within a loop, the first address at which each line starts is

TABLE 2

| | 16-order matrix data storage in a non-conflicting manner of addresses | | | | | | | | | | | | | | | |
|---|---|---|---|---|---|---|---|---|---|---|---|---|---|---|---|---|
| addr | 0 | 1 | 2 | 3 | 4 | 5 | 6 | 7 | 8 | 9 | 10 | 11 | 12 | 13 | 14 | 15 |
| mem_0 | $M_{12}$ $M_{21}$ | $M_{110}$ $M_{101}$ | $M_{916}$ $M_{169}$ | $M_{210}$ $M_{102}$ | $M_{1016}$ $M_{1610}$ | $M_{310}$ $M_{103}$ | $M_{1116}$ $M_{1611}$ | $M_{410}$ $M_{104}$ | $M_{1216}$ $M_{1612}$ | $M_{510}$ $M_{105}$ | $M_{1316}$ $M_{1613}$ | $M_{610}$ $M_{106}$ | $M_{1416}$ $M_{1614}$ | $M_{710}$ $M_{107}$ | $M_{1516}$ $M_{1613}$ | $M_{810}$ $M_{108}$ |
| mem_1 | $M_{13}$ $M_{31}$ | $M_{111}$ $M_{111}$ | $M_{23}$ $M_{32}$ | $M_{211}$ $M_{112}$ | $M_{915}$ $M_{159}$ | $M_{311}$ $M_{113}$ | $M_{1015}$ $M_{1510}$ | $M_{411}$ $M_{114}$ | $M_{1115}$ $M_{1511}$ | $M_{511}$ $M_{115}$ | $M_{1215}$ $M_{1512}$ | $M_{611}$ $M_{116}$ | $M_{1315}$ $M_{1513}$ | $M_{711}$ $M_{117}$ | $M_{1415}$ $M_{1514}$ | $M_{811}$ $M_{118}$ |
| mem_2 | $M_{14}$ $M_{41}$ | $M_{112}$ $M_{121}$ | $M_{24}$ $M_{42}$ | $M_{212}$ $M_{122}$ | $M_{34}$ $M_{43}$ | $M_{312}$ $M_{123}$ | $M_{914}$ $M_{149}$ | $M_{412}$ $M_{124}$ | $M_{1014}$ $M_{1410}$ | $M_{512}$ $M_{125}$ | $M_{1114}$ $M_{1411}$ | $M_{612}$ $M_{126}$ | $M_{1214}$ $M_{1412}$ | $M_{712}$ $M_{127}$ | $M_{1314}$ $M_{1413}$ | $M_{812}$ $M_{128}$ |
| mem_3 | $M_{15}$ $M_{51}$ | $M_{113}$ $M_{131}$ | $M_{25}$ $M_{52}$ | $M_{213}$ $M_{132}$ | $M_{35}$ $M_{53}$ | $M_{313}$ $M_{133}$ | $M_{45}$ $M_{54}$ | $M_{413}$ $M_{134}$ | $M_{913}$ $M_{139}$ | $M_{513}$ $M_{135}$ | $M_{1013}$ $M_{1310}$ | $M_{613}$ $M_{136}$ | $M_{1113}$ $M_{1311}$ | $M_{713}$ $M_{137}$ | $M_{1213}$ $M_{1312}$ | $M_{813}$ $M_{138}$ |
| mem_4 | $M_{16}$ $M_{61}$ | $M_{114}$ $M_{141}$ | $M_{26}$ $M_{62}$ | $M_{214}$ $M_{142}$ | $M_{36}$ $M_{63}$ | $M_{314}$ $M_{143}$ | $M_{46}$ $M_{64}$ | $M_{414}$ $M_{144}$ | $M_{56}$ $M_{65}$ | $M_{514}$ $M_{145}$ | $M_{912}$ $M_{129}$ | $M_{614}$ $M_{146}$ | $M_{1012}$ $M_{1210}$ | $M_{714}$ $M_{147}$ | $M_{1112}$ $M_{1211}$ | $M_{814}$ $M_{148}$ |
| mem_5 | $M_{17}$ $M_{71}$ | $M_{115}$ $M_{151}$ | $M_{27}$ $M_{72}$ | $M_{215}$ $M_{152}$ | $M_{37}$ $M_{73}$ | $M_{315}$ $M_{153}$ | $M_{47}$ $M_{74}$ | $M_{415}$ $M_{154}$ | $M_{57}$ $M_{75}$ | $M_{515}$ $M_{155}$ | $M_{67}$ $M_{76}$ | $M_{615}$ $M_{156}$ | $M_{911}$ $M_{119}$ | $M_{715}$ $M_{157}$ | $M_{1011}$ $M_{1110}$ | $M_{815}$ $M_{158}$ |
| mem_6 | $M_{18}$ $M_{81}$ | $M_{116}$ $M_{161}$ | $M_{28}$ $M_{82}$ | $M_{216}$ $M_{162}$ | $M_{38}$ $M_{83}$ | $M_{316}$ $M_{163}$ | $M_{48}$ $M_{84}$ | $M_{416}$ $M_{164}$ | $M_{58}$ $M_{85}$ | $M_{516}$ $M_{165}$ | $M_{68}$ $M_{86}$ | $M_{616}$ $M_{166}$ | $M_{78}$ $M_{87}$ | $M_{716}$ $M_{167}$ | $M_{910}$ $M_{109}$ | $M_{816}$ $M_{168}$ |
| mem_7 | $M_{19}$ $M_{91}$ | — | $M_{29}$ $M_{92}$ | — | $M_{39}$ $M_{93}$ | — | $M_{49}$ $M_{94}$ | — | $M_{59}$ $M_{95}$ | — | $M_{69}$ $M_{96}$ | — | $M_{79}$ $M_{97}$ | — | $M_{89}$ $M_{98}$ | — |

The reading and writing rules of the module for modifying will be described in detail below.

The orders of the modifying matrix and the matrix to be modified are both n-order, where n has a value of integral multiple of 16. In cases where the order of the source matrix is not a value multiple of 16, the source matrix is expanded by the concept of the block matrix, and the final inversion matrix is reduced to the original order.

Since it adopts 8-path memory, 8 row data may be deal with at one time. Module D1 contains a modifying matrix m, and set that one loop includes 8 rows, which are deal with at the same time. The first address of each loop is addr_m_start=addr_m_start+1, and the address of each row diagonal element in each loop is addr_m=addr_m+1; and module D0 stores diagonal metadata before and after two modifying processes, its address rule is similar with matrix m.

M0 and M1 store non-diagonal metadata before and after two modifying processes, which are stored in a conflict-free design of data. The address reading and writing rules of M0 and M1 are similar, and only the M0 read address rules are described here. Because the address rules of the upper and lower triangular matrices are slightly different, they are described separately.

For the upper triangular matrix, set each 8 rows as one loop, and 8 columns data of the 8 rows are listed as a small addr_l_row=addr_l_row+1k. Within a row, the storage address is addr_l=addr_l+n/8. For the latter n/2 column, every 8 columns act as a small loop. The base address of the first loop is addr_l_row=addr_l_start+6k+n×n/16−n/8−1; the address after address jump between two loops is addr_l_row=addr_l_row+7k−n/8−1; the first address of a loop is addr_l_row=addr_l_row−1k−n/8. Within one line, the storage address is addr_l=addr_l+n/8.

The inverter in this design is implemented on the development board of the Xilinx Virtex-7 series and is built on Vivado software. After the functional verification is completed, several sets data with different orders and different range of value are tested. The inverse results obtained are compared with the ones of Matlab modeling to analyze the errors. The specific data are shown in Table 3.

TABLE 3

| Hardware verification data and error | | |
|---|---|---|
| Matrix order n | Range of data values | Maximum absolute error |
| 32 | (−10, 10) | 5.0128e−06 |
| | | 5.4937e−06 |
| | | 2.5622e−05 |

TABLE 3-continued

Hardware verification data and error

| Matrix order n | Range of data values | Maximum absolute error |
|---|---|---|
|  | (−100, 100) | 9.0129e−06 |
|  |  | 6.1144e−06 |
|  |  | 6.5052e−06 |
| 128 | (−10, 10) | 6.0034e−05 |
|  |  | 5.0213e−06 |
|  |  | 9.3276e−05 |
|  | (−100, 100) | 5.3830e−05 |
|  |  | 2.4653e−05 |
|  |  | 6.1297e−06 |

As can be seen from the table above, the maximum absolute error is about $e^{-5}$, within the acceptable range. This is because hardware implementations need to take into account some actual circuit delays, numerical accuracy conversion and other undesirable factors. Therefore, the correctness of an efficient data processing method proposed in the present invention is verified.

The following is an example of Embodiment 3 taking 16-path parallel structure, and the operators are mainly based on efficient pipeline design. From several aspects, such as the scope of applying and the operation increment (compared with the angle-dominant in-situ replacement algorithm in "One Matrix Inverse Method" Hei Zhijian), the data processing method in this article is compared with the two methods in Teacher Hei Zhijian's "One Matrix Inverse Method" and "Matrix In-situ Replacement Solution Method". Assuming that the matrix order is n, the comparison results are shown in Table 4.

As can be seen from the Table 4, compared with Method 2, the method proposed by the present invention broadens the scope of applying without adding any calculations. Although Method 3 has the same applicability as Method 1, it introduces a large number of multiplication and adding calculations, increasing the length of the assembly line and additional multiplier resources. When the scale of the matrix increases, it is more obvious, and is very bad for engineering realization. The Method 1 provided by the present invention does not add any additional operations, as well as does not increase the length of the assembly line and the computing resources.

TABLE 4

Hardware comparison of three matrix inversing methods

|  | Method 1 the method of the present invention | Method 2 One Matrix Inverse Method | Method 3 Matrix In-situ Replacement Solution Method |
|---|---|---|---|
| Scope of application | Non-singular array | Diagonal dominance matrix | Non-singular array |
| Operation increment | 0 | 0 | $2n^2$ times of addition/subtraction operations $3n^2$ times of addition/subtraction operations |

The above three embodiments respectively describe efficient data processing methods of the present invention in detail from three aspects, including improved inverse algorithm verification, data processing method modeling and engineering mapping implementation.

The invention claimed is:

1. A data processing device including a non-transitory device-readable medium configured to, when executed by the data processing device, instruct the data processing device to calculate an inverse matrix of a source matrix A with a reduced computing amount, wherein, the non-transitory device-readable medium stores therein:
a module for calculating reduced coefficient matrices;
a storage module;
a module for modifying reduced coefficient matrices;
a module for triangular inversing;
a module for obtaining inversion matrices; and
a module for correcting reverse result,
wherein the module of calculating reduced coefficient matrices is used to perform primary row transformation and primary column transformation on upper triangular matrix and lower triangular matrix of the source matrix A respectively, obtaining an upper triangular matrix and a lower triangular matrix, and obtain a reduced coefficient matrix N of the source matrix A by combining the upper triangular matrix and the lower triangular matrix,
wherein the module for modifying reduced coefficient matrices is used to modifying all diagonal elements of the reduced coefficient matrix N as positive numbers by reading and writing operation, to obtain the modified reduced coefficient matrix N',
wherein the module for triangular inversing is used to reverse a upper triangle matrix of the modified reduced coefficient matrix and a lower triangle matrix of the modified reduced coefficient matrix, respectively, and obtain the modified upper and lower triangular inversion matrix $U^{*-1}$ and $L^{*-1}$ respectively,
wherein the module for obtaining inversion matrices is used to multiply the modified upper triangular inversion matrix $U^{*-1}$ with the modified lower triangle inversion matrix $L^{*-1}$, to obtain a modified inversion matrix $A^{*-1}$,
wherein the module for correcting reverse result is used to make a secondary modifying of the modified inversion matrix $A^{*-1}$ by reading and writing operation in a memory,
wherein the storage module is used to store the computing data,
wherein the module for modifying reduced coefficient matrices modifies the reduced coefficient matrix N by: multiplying the reduced coefficient matrix N with a modifying matrix m on the right,
wherein the diagonal elements of modifying matrix m are read first, and then a symbol bits of the diagonal element are checked one by one, if the symbol bit of one diagonal element is positive, no operation is performed on the row of the reduced coefficient matrix N corresponding to the diagonal element; or else, the entire row of data corresponding to the diagonal element is read out, the symbol bits of elements in this row are reversed, and the entire row of data is written back to its original storage location,
wherein the module for correcting reverse result makes a secondary modification on the modified inversion matrix by the following formula:

$$A^{-1}=A^{*-1} \times m \tag{11}$$

wherein the operation of formula (11) is performed as such: read the diagonal elements of the modifying matrix m at first, and then symbol bits of the diagonal elements are checked one by one, if the symbol bit of one diagonal element is positive, no operation is performed on the column of the modified reverse matrix A*−1; or else, the entire column of data corresponding to the diagonal element is read out, the symbol bits of elements in this column are reversed, and the entire column of data is written back to its original storage location, wherein the source matrix A is expressed as $$\begin{bmatrix} M_{11} & M_{12} & L & M_{1i} & L & M_{1n} \\ M_{21} & M_{22} & L & M_{2i} & L & M_{2n} \\ M & M & L & M & L & M \\ M_{j1} & M_{j2} & L & M_{ji} & L & M_{jn} \\ M & M & L & M & L & M \\ M_{n1} & M_{n2} & L & M_{ni} & L & M_{nn} \end{bmatrix},$$

is a n-order square in which none of the sequential principal minor is equal to 0 in each order, wherein i=1,2,3, ..., n, and j=1,2,3, ..., n, and wherein the module for triangular inversing is used to obtain the modified triangular inversion matrix $U^{*-1}$ and $L^{*-1}$ based on the modified reduced coefficient matrix:

$$U^{*-1} = \begin{bmatrix} u_{11} & u_{12} & \ldots & u_{1i} & \ldots & u_{1n} \\ & u_{22} & \ldots & u_{2i} & \ldots & u_{2n} \\ & & \ddots & \vdots & \ldots & \vdots \\ & & & u_{ii} & \ldots & u_{in} \\ & & & & \ddots & \vdots \\ & & & & & u_{nn} \end{bmatrix} \text{ and} \qquad (8)$$

$$L^{*-1} = \begin{bmatrix} l_{11} & & & & & \\ l_{21} & l_{22} & & & & \\ \vdots & \vdots & \ddots & & & \\ l_{j1} & l_{j2} & \ldots & l_{jj} & & \\ \vdots & \vdots & \vdots & \vdots & \ddots & \\ l_{n1} & l_{n2} & \ldots & l_{ni} & \ldots & l_{nn} \end{bmatrix};$$

wherein,
$$\begin{cases} U_{ji}^* = \dfrac{N_{ji}'}{\sqrt{N_{ii}'}}, & j < i \\ L_{ji}^* = \dfrac{N_{ji}'}{\sqrt{N_{ii}'}}, & j > i \\ U_{ii}^* = L_{ii}^* = \dfrac{N_{ii}'}{\sqrt{N_{ii}'}}, & i = j \\ U_{ji}^* = 0, & j > i \\ L_{ji}^* = 0, & j < i \end{cases}$$

$$\begin{cases} l_{ii} = u_{ii} = \dfrac{1}{\sqrt{N_{ii}'}}, & i = 1, 2, 3, \ldots, n \\ l_{ji} = -l_{jj} \times \sum\limits_{s=i}^{j-1} (N_{js}' \times l_{ss} \times l_{si}), & \begin{array}{l} i = 1, 2, 3, \ldots, n; \\ j = i+1, i+2, \ldots, n \end{array} \\ u_{ji} = -u_{ii} \times \sum\limits_{s=j}^{i-1} (N_{si}' \times u_{ss} \times u_{js}), & \begin{array}{l} j = 1, 2, 3, \ldots, n; \\ i = j+1, \\ j+2, \ldots, n \end{array} \end{cases} \qquad (9)$$

2. The data processing device of claim 1, wherein, the module for obtaining inversion matrix calculates modified inversion matrix based on the following formula:

$$A^{*-1} = U^{*-1} \times L^{*-1} \qquad (10).$$

3. A data processing method, which is used to calculate an inverse matrix of a source matrix A with a reduced computing amount, wherein, the data processing method includes:

Step S1, performing the primary row transformation and the primary column transformation on a source matrix A respectively, obtaining an upper triangular matrix and a lower triangular matrix, and obtain a reduced coefficient matrix N of the source matrix A by combining the upper triangular matrix and the lower triangular matrix;

Step S2, modifying each value of diagonal elements of the reduced coefficient matrix N to positive ones by reading and writing operation, to get the modified reduced coefficient matrix N';

Step S3, reversing the upper triangle matrix of the modified reduced coefficient matrix and the lower triangle matrix of the modified reduced coefficient matrix, respectively, and obtaining the modified upper and lower triangular inversion matrix $U^{*-1}$ and $L^{*-1}$ respectively;

Step S4, multiply the modified upper triangle inversion matrix $U^{*-1}$ with the modified lower triangle inversion matrix $L^{*-1}$, so as to get the modified inversion matrix A-1; and Step S5, make a secondary modifying of the modified inversion matrix $A^{*-1}$ by reading and writing operation in a memory, wherein modifying the reduced coefficient matrix N in step S2 by: multiplying the reduced coefficient matrix N with a correction matrix m on the right, wherein, the diagonal elements of modifying matrix m are read first, and then a symbol bits of the diagonal element are checked one by one, if the symbol bit of one diagonal element is positive, no operation is performed on the row of the reduced coefficient matrix N corresponding to the diagonal element; or else, the entire row of data corresponding to the diagonal element is read out, the symbol bits of elements in this row are reversed, and the entire row of data is written back to its original storage location, and making a secondary modifying of the modified inversion matrix $A^{*-1}$ in step S5 by the following formula:

$$A^{-1} = A^{*-1} \times m \qquad (11), \text{ and}$$

wherein the operation of formula (11) is performed as such: read the diagonal elements of the correction matrix m at first, and then symbol bits of the diagonal elements are checked one by one, if the symbol bit of one diagonal element is positive, no operation is performed on the column of the modified reverse matrix A*-1; or else, the entire column of data corresponding to the diagonal element is read out, the symbol bits of elements in this column are reversed, and the entire column of data is written back to its original storage location.

* * * * *